US007736324B1

(12) United States Patent
Helgeson

(10) Patent No.: US 7,736,324 B1
(45) Date of Patent: Jun. 15, 2010

(54) PORTABLE HUMAN BODY PULSATING APPARATUS MOUNTED ON A PEDESTAL

(75) Inventor: Lonnie J. Helgeson, New Prague, MN (US)

(73) Assignee: Electromed, Inc., New Prague, MN (US)

( * ) Notice: Subject to any disclaimer, the term of this patent is extended or adjusted under 35 U.S.C. 154(b) by 1107 days.

(21) Appl. No.: 11/397,311

(22) Filed: Apr. 4, 2006

Related U.S. Application Data

(60) Provisional application No. 60/669,100, filed on Apr. 7, 2005.

(51) Int. Cl.
*A61H 23/00* (2006.01)
*F16M 11/04* (2006.01)

(52) U.S. Cl. ........................ 601/41; 601/152; 248/129; 248/161

(58) Field of Classification Search .................. 601/41, 601/44, 148–152; 248/129, 161, 157, 188.7
See application file for complete search history.

(56) References Cited

U.S. PATENT DOCUMENTS

| | | | | | |
|---|---|---|---|---|---|
| 1,282,600 | A | * | 10/1918 | Lawlor | 248/129 |
| 2,613,755 | A | * | 10/1952 | Newby et al. | 180/68.5 |
| 2,779,329 | A | | 1/1957 | Huxley et al. | |
| 2,780,222 | A | | 2/1957 | Polzin et al. | |
| 3,333,581 | A | | 8/1967 | Robinson et al. | |
| D241,275 | S | * | 8/1976 | Green | D24/169 |
| 4,133,305 | A | | 1/1979 | Steuer | |
| 4,607,897 | A | * | 8/1986 | Schwartz | 312/209 |
| 4,838,263 | A | | 6/1989 | Warwick et al. | |
| 4,944,292 | A | * | 7/1990 | Gaeke et al. | 128/204.18 |
| D341,890 | S | * | 11/1993 | Sievert et al. | D24/169 |
| D342,788 | S | * | 12/1993 | Weaver et al. | D24/167 |
| 5,366,275 | A | | 11/1994 | Sulzer | |
| 5,562,091 | A | * | 10/1996 | Foster et al. | 128/200.24 |
| 5,569,170 | A | * | 10/1996 | Hansen | 601/150 |
| 5,769,800 | A | | 6/1998 | Gelfand | |
| 6,036,662 | A | | 3/2000 | Van Brunt et al. | |
| 6,149,674 | A | * | 11/2000 | Borders | 607/96 |
| 6,360,389 | B1 | * | 3/2002 | Gallant et al. | 5/658 |
| 6,461,315 | B1 | * | 10/2002 | Gattinoni | 601/41 |
| 6,547,749 | B2 | * | 4/2003 | Hansen | 601/48 |
| 6,578,501 | B1 | * | 6/2003 | Moore | 108/147 |
| 6,676,614 | B1 | * | 1/2004 | Hansen et al. | 601/41 |
| D518,267 | S | * | 3/2006 | Arceta | D34/14 |
| 7,270,062 | B1 | * | 9/2007 | Larson | 108/147 |
| 7,562,883 | B2 | * | 7/2009 | Livengood et al. | 280/87.01 |
| 2001/0007928 | A1 | * | 7/2001 | Hansen | 601/41 |
| 2002/0016560 | A1 | * | 2/2002 | Hansen | 601/48 |
| 2004/0064076 | A1 | * | 4/2004 | Bilgi | 601/149 |
| 2006/0009718 | A1 | * | 1/2006 | Van Brunt et al. | 601/41 |
| 2007/0010765 | A1 | * | 1/2007 | Rothman et al. | 601/41 |

* cited by examiner

*Primary Examiner*—Danton DeMille
(74) *Attorney, Agent, or Firm*—Richard John Bartz

(57) ABSTRACT

A portable human body pulsating apparatus has an air pressure and air pulse generator located within a case mount on a pedestal having wheels to facilitate movement of the apparatus on a surface. The pedestal has an upright piston and cylinder assembly operable to adjust the elevation of the case and generator.

5 Claims, 7 Drawing Sheets

PORTABLE HUMAN BODY PULSATING APPARATUS MOUNTED ON A PEDESTAL

CROSS REFERENCE TO RELATED APPLICATION

This application claims the priority of U.S. Application Ser. No. 60/669,100 filed Apr. 7, 2005.

FIELD OF THE INVENTION

The invention relates to a portable medical device operable with a vest to apply repetitive compression forces to the body of a person to aid blood circulation, loosen and eliminate mucus from the lungs and trachea and relieve muscular and nerve tensions.

BACKGROUND OF THE INVENTION

Clearance of mucus from the respiratory tract in healthy individuals is accomplished primarily by the body's normal mucociliary action and cough. Under normal conditions these mechanisms are very efficient. Impairment of the normal mucociliary transport system or hypersecretion of respiratory mucus results in an accumulation of mucus and debris in the lungs and can cause severe medical complications such as hypoxemia, hypercapnia, chronic bronchitis and pneumonia. These complications can result in a diminished quality of life or even become a cause of death. Abnormal respiratory mucus clearance is a manifestation of many medical conditions such as pertussis, cystic fibrosis, atelectasis, bronchiectasis, cavitating lung disease, vitamin A deficiency, chronic obstructive pulmonary disease, asthma, and immotile cilia syndrome. Exposure to cigarette smoke, air pollutants and viral infections also adversely affect mucociliary function. Post surgical patients, paralyzed persons, and newborns with respiratory distress syndrome also exhibit reduced mucociliary transport.

Chest physiotherapy has had a long history of clinical efficacy and is typically a part of standard medical regimens to enhance respiratory mucus transport. Chest physiotherapy can include mechanical manipulation of the chest, postural drainage with vibration, directed cough, active cycle of breathing and autogenic drainage. External manipulation of the chest and respiratory behavioral training are accepted practices. The various methods of chest physiotherapy to enhance mucus clearance are frequently combined for optimal efficacy and are prescriptively individualized for each patient by the attending physician.

Cystic fibrosis (CF) is the most common inherited life-threatening genetic disease among Caucasians. The genetic defect disrupts chloride transfer in and out of cells, causing the normal mucus from the exocrine glands to become very thick and sticky, eventually blocking ducts of the glands in the pancreas, lungs and liver. Disruption of the pancreatic glands prevents secretion of important digestive enzymes and causes intestinal problems that can lead to malnutrition. In addition, the thick mucus accumulates in the lung's respiratory tracts, causing chronic infections, scarring, and decreased vital capacity. Normal coughing is not sufficient to dislodge these mucus deposits. CF usually appears during the first 10 years of life, often in infancy. Until recently, children with CF were not expected to live into their teens. However, with advances in digestive enzyme supplementation, anti-inflammatory therapy, chest physical therapy, and antibiotics, the median life expectancy has increased to 30 years with some patients living into their 50s and beyond. CF is inherited through a recessive gene, meaning that if both parents carry the gene, there is a 25 percent chance that an offspring will have the disease, a 50 percent chance they will be a carrier and a 25 percent chance they will be genetically unaffected. Some individuals who inherit mutated genes from both parents do not develop the disease. The normal progression of CF includes gastrointestinal problems, failure to thrive, repeated and multiple lung infections, and death due to respiratory insufficiency. While some patients experience grave gastrointestinal symptoms, the majority of CF patients (90 percent) ultimately succumb to respiratory problems.

Virtually all patients with CF require respiratory therapy as a daily part of their care regimen. The buildup of thick, sticky mucus in the lungs clogs airways and traps bacteria, providing an ideal environment for respiratory infections and chronic inflammation. This inflammation causes permanent scarring of the lung tissue, reducing the capacity of the lungs to absorb oxygen and, ultimately, sustain life. Respiratory therapy must be performed, even when the patient is feeling well, to prevent infections and maintain vital capacity. Traditionally, care providers perform Chest Physical Therapy (CPT) one to four times per day. CPT consists of a patient lying in one of twelve positions while a caregiver "claps" or pounds on the chest and back over each lobe of the lung. To treat all areas of the lung in all twelve positions requires pounding for half to three-quarters of an hour along with inhalation therapy. CPT clears the mucus by shaking loose airway secretions through chest percussions and draining the loosened mucus toward the mouth. Active coughing is required to ultimately remove the loosened mucus. CPT requires the assistance of a caregiver, often a family member but a nurse or respiratory therapist if one is not available. It is a physically exhausting process for both the CF patient and the caregiver. Patient and caregiver non-compliance with prescribed protocols is a well-recognized problem that renders this method ineffective. CPT effectiveness is also highly technique sensitive and degrades as the giver becomes tired. The requirement that a second person be available to perform the therapy severely limits the independence of the CF patient.

Artificial respiration devices for applying and relieving pressure on the chest of a person have been used to assist in lung breathing functions, and loosening and eliminating mucus from the lungs of CF persons. Subjecting the person's chest and lungs to pressure pulses or vibrations decreases the viscosity of lung and air passage mucus, thereby enhancing fluid mobility and removal from the lungs. An example of a body pulsating method and device disclosed by C. N. Hansen in U.S. Pat. No. 6,547,749, incorporated herein by reference, has a case accommodating an air pressure and pulse generator. A handle pivotally mounted on the case is used as a hand grip to facilitate transport of the generator. The case including the generator must be carried by a person to different locations to provide treatment to individuals in need of respiratory therapy. These devices use vests having air-accommodating bladders that surround the chests of persons. An example of a vest used with a body pulsating device is disclosed by C. N. Hansen and L. J. Helgeson in U.S. Pat. No. 6,676,614. The vest is used with an air pressure and pulse generator. Mechanical mechanisms, such as solenoid or motor-operated air valves, bellows and pistons are disclosed in the prior art to supply air under pressure to diaphragms and bladders in regular pattern or pulses. Manually operated controls are used to adjust the pressure of the air and air pulse frequency for each patient treatment and during the treatment. The bladder worn around the thorax of the CF person repeatedly compresses and releases the thorax at frequencies as high as 25cycles per second. Each compression produces a rush of air through the lobes of the lungs that shears the secretions from the sides of the airways and propels them toward the mouth where they can be removed by normal coughing. Examples of chest compression medical devices are disclosed in the following U.S. Patents.

W J Warwick and L G. Hansen in U.S. Pat. Nos. 4,838,263 and 5,056,505 disclose a chest compression apparatus having a chest vest surrounding a person's chest. A motor-driven rotary valve located in a housing located on a table allows air to flow into the vest and vent air therefrom to apply pressurized pulses to the person's chest. An alternative pulse pumping system has a pair of bellows connected to a crankshaft with rods operated with a dc electric motor. The speed of the motor is regulated with a controller to control the frequency of the pressure pulses applied to the vest. The patient controls the pressure of the air in the vest by opening and closing the end of an air vent tube. The apparatus must be carried by a person to different locations to provide treatment to persons in need of respiratory therapy.

M Gelfand in U.S. Pat. No. 5,769,800 discloses a vest design for a cardiopulmonary resuscitation system having a pneumatic control unit equipped with wheels to allow the control unit to be moved along a support surface.

N. P. Van Brunt and D J Gagne in U.S. Pat. Nos. 5,769,797 and 6,036,662 disclose an oscillatory chest compression device having an air pulse generator including a wall with an air chamber and a diaphragm mounted on the wall and exposed to the air chamber. A rod pivotally connected to the diaphragm and rotatably connected to a crankshaft transmits force to the diaphragm during rotation of the crankshaft. An electric motor drives the crankshaft at selected, controlled speeds to regulate the frequency of the air pulses generated by the moving diaphragm. A blower delivers air to the air chamber to maintain the pressure of the air in the chamber. Controls for the motors that move the diaphragm and rotate the blower are responsive to the air pressure pulses and pressure of the air in the air chamber. These controls have air pulse and air pressure responsive feedback systems that regulate the operating speeds of the motors to control the pulse frequency and air pressure in the vest. The air pulse generator is a mobile unit having a handle and a pair of wheels.

SUMMARY OF THE INVENTION

The invention is a medical device used to deliver high-frequency chest wall oscillations to promote airway clearance and improve bronchial drainage in humans. The primary components of the device include an air-pulse generator, an air inflatable vest, and a flexible hose coupling the generator to the vest for transmitting air pressure and pressure pulses from the generator to the vest. The air-pulse generator is mounted on a pedestal having wheels that allow the generator to be moved to different locations to provide therapy treatments to a number of persons. The pedestal includes a linear lift that allows the elevation or height of the air-pulse generator to be adjusted to accommodate different locations and persons. The air-pulse generator is mounted in an open top case exposing generator controls for convenient use. Clamp members engage opposite ends of the case and are secured to a platform attached to the top of the pedestal.

DESCRIPTION OF INVENTION

Figure 1:
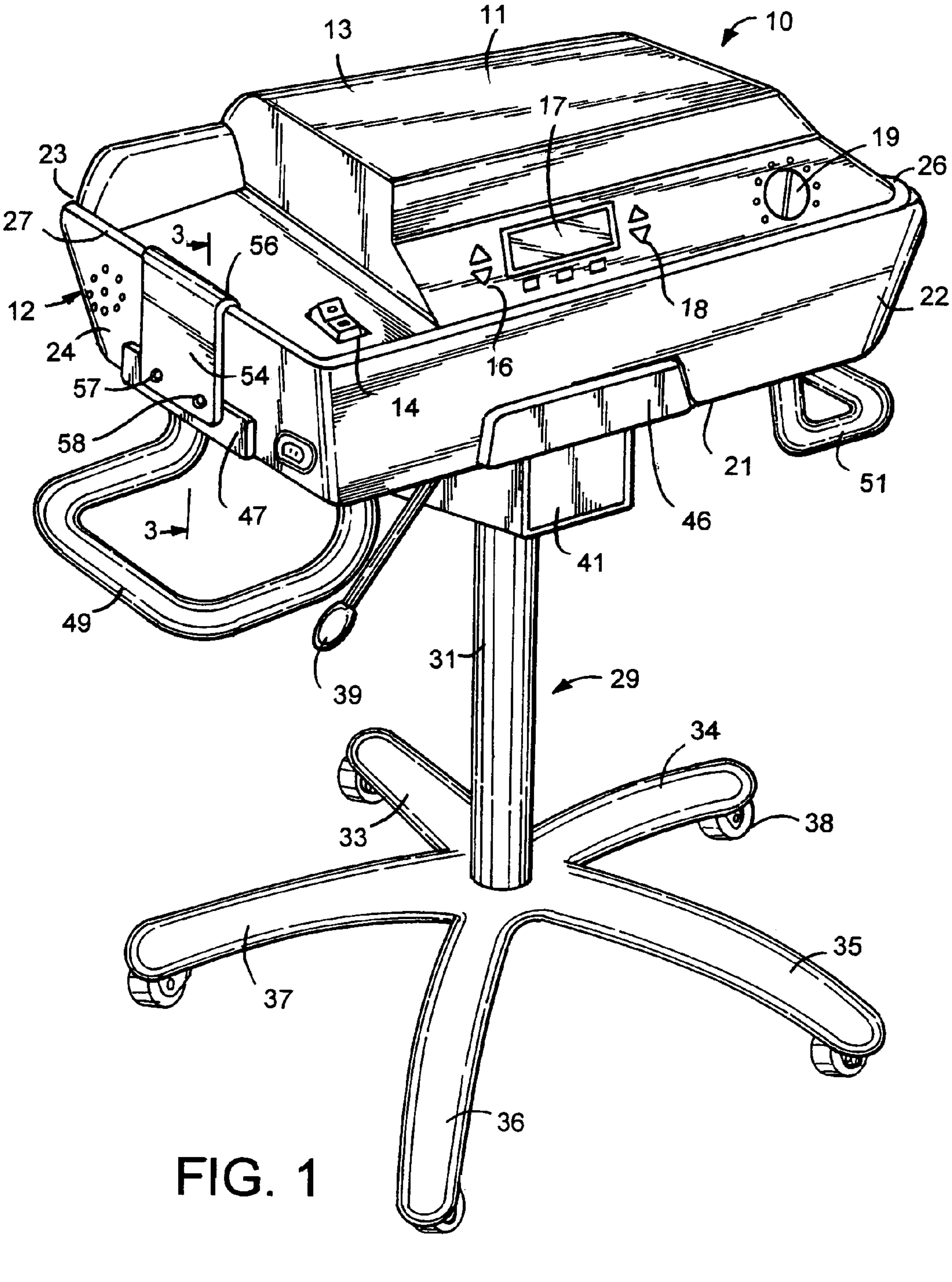
FIG. 1 is a perspective view of an air-pulse generator of a portable human body pulsating apparatus and movable pedestal of the invention in its lower position.
Figure 4:
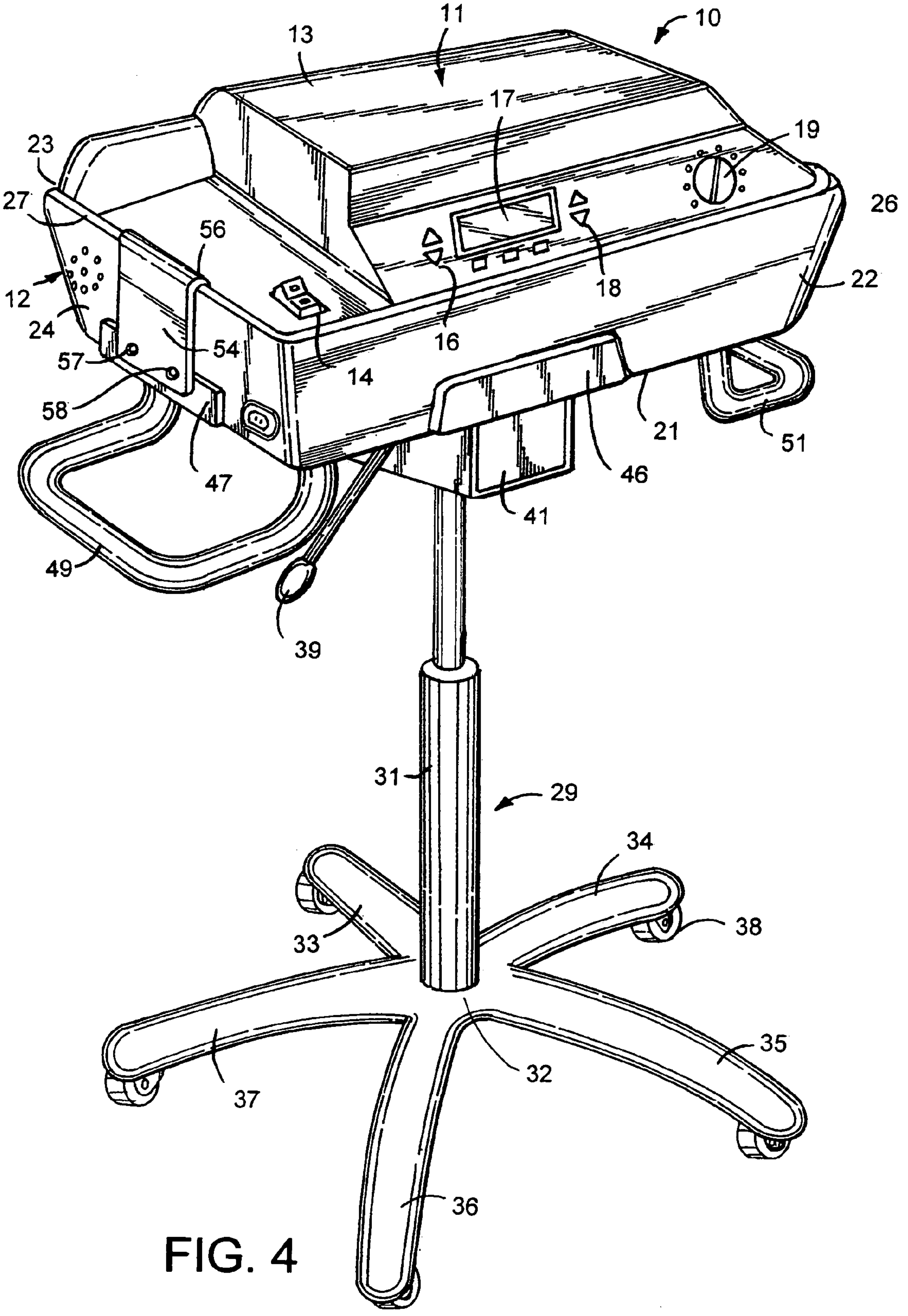
FIG. 4 is a perspective view of the air-pulse generator of a portable human body pulsating apparatus and movable pedestal of FIG. 1 in its elevated position.

A portable human body pulsating apparatus 10, shown in FIGS. 1 and 4, comprises an air-pulse generator 11 mount in an open top case 12. A movable pedestal 29 supports generator 11 and case 12 on a surface, such as a floor. Pedestal 29 allows respiratory therapists and patient careperson to transport the entire human body pulsating apparatus to different locations accommodating a number of persons in need of respiratory therapy and to storage locations.

Human body pulsating apparatus 10 is used with a vest (not shown) to apply repetitive pressure pulse to a person's thorax to provide secretion and mucous clearance therapy. An example of a respiratory vest is disclosed by C. N. Hansen and L H. Helgeson in U.S. Pat. No. 6,676,614 incorporated herein by reference. Respiratory mucous clearance is applicable to many medical conditions, such as pertussis, cystic fibrosis, atelectasis, bronchiectasis, cavitating lung disease, vitamin A deficiency, chronic obstructive pulmonary disease, asthma, and immobile cilia syndrome. Post surgical patients, paralyzed persons, and newborns with respiratory distress syndrome have reduced mucociliary transport. Apparatus 10 provides high frequency chest wall oscillations or pulses to enhance mucus and airway clearance in a person with reduced mucociliary transport. High frequency pressure pulses subject to the thorax in addition to providing respiratory therapy to a person's lungs and trachea, also stimulates the heart and blood flow in arteries and veins in the chest cavity. Muscular and nerve tensions are also relieved by the repetitive pressure pulses imparted to the front, sides, and back portions of the thorax. The lower part of the thoracic cage comprises the abdominal cavity which reaches upward as high as the lower tip of the sternum so as to afford considerable protection to the large and easily injured abdominal organs, such as the liver, spleen, stomach, and kidneys. The abdominal cavity is only subjected to very little high frequency pressure pulses.

Case 12 is a rectangular box-shaped rigid plastic shell having an open rectangular top accommodating the operating components of air pulse generator 11. Case 12 has a generally flat bottom wall 21 joined to upright side walls 22 and 23 and end walls 24 and 26. Walls 22-24 and 26 have a continuous top edge 27. A layer or cushion 28 of flexible foam plastic is interposed between top wall 13 and the inside surfaces of walls 22-24 and 26 to mitigate vibrations and noise during operation of generator 11.

Air pulse generator 11 has a top wall 13 closing the open top of case 13 and confining the operating elements and controls within case 13. An ON-OFF switch on wall 13 controls the supply of electric power to generator 13. Time control keys 16 and frequency control keys 18 located on opposite sides of visual control screen 17 are on the front section of top wall 13. An air pressure control knob is located on the right front side of top wall. Switch 14, keys 16 and 18, screen 19 and air pressure control knob 19 are in locations that are readily accessible by the respiratory therapists and user of apparatus 10. The operating elements and functions and controls of generator 11 are disclosed by C. N. Hansen, P. E. Cross and L. T. Helgeson in U.S. application Ser. No. 11/089,862 and incorporated herein by reference. An alternative air pulse generators are disclosed by C. N. Hansen in U.S. Pat. Nos. 6,488,641 and 6,547,749 incorporated herein by reference.

Person care homes, assisted living facilities and clinics can accommodate a number of persons in different rooms or locations that require respiratory therapy or high frequency chest wall oscillations as medical treatments. The portable pulsating apparatus 10 can be manually moved to required locations and connect with a flexible hose to a vest located around a person's thorax or other body members. The vest can be a single person garment designed to comfortably fit the person.

Figure 2:
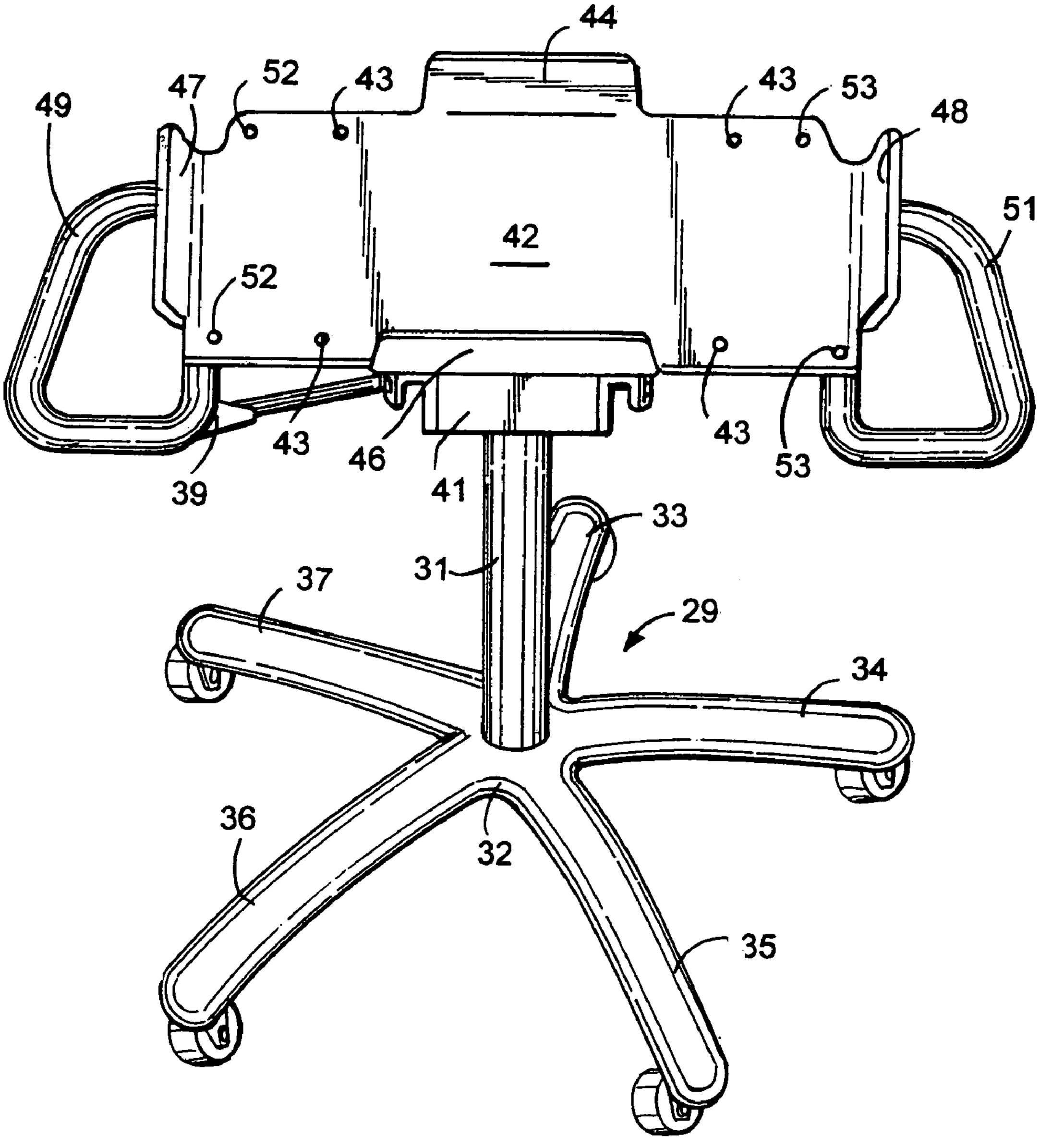
FIG. 2 is a perspective view of the movable pedestal of the apparatus of FIG. 1.
Figure 5:
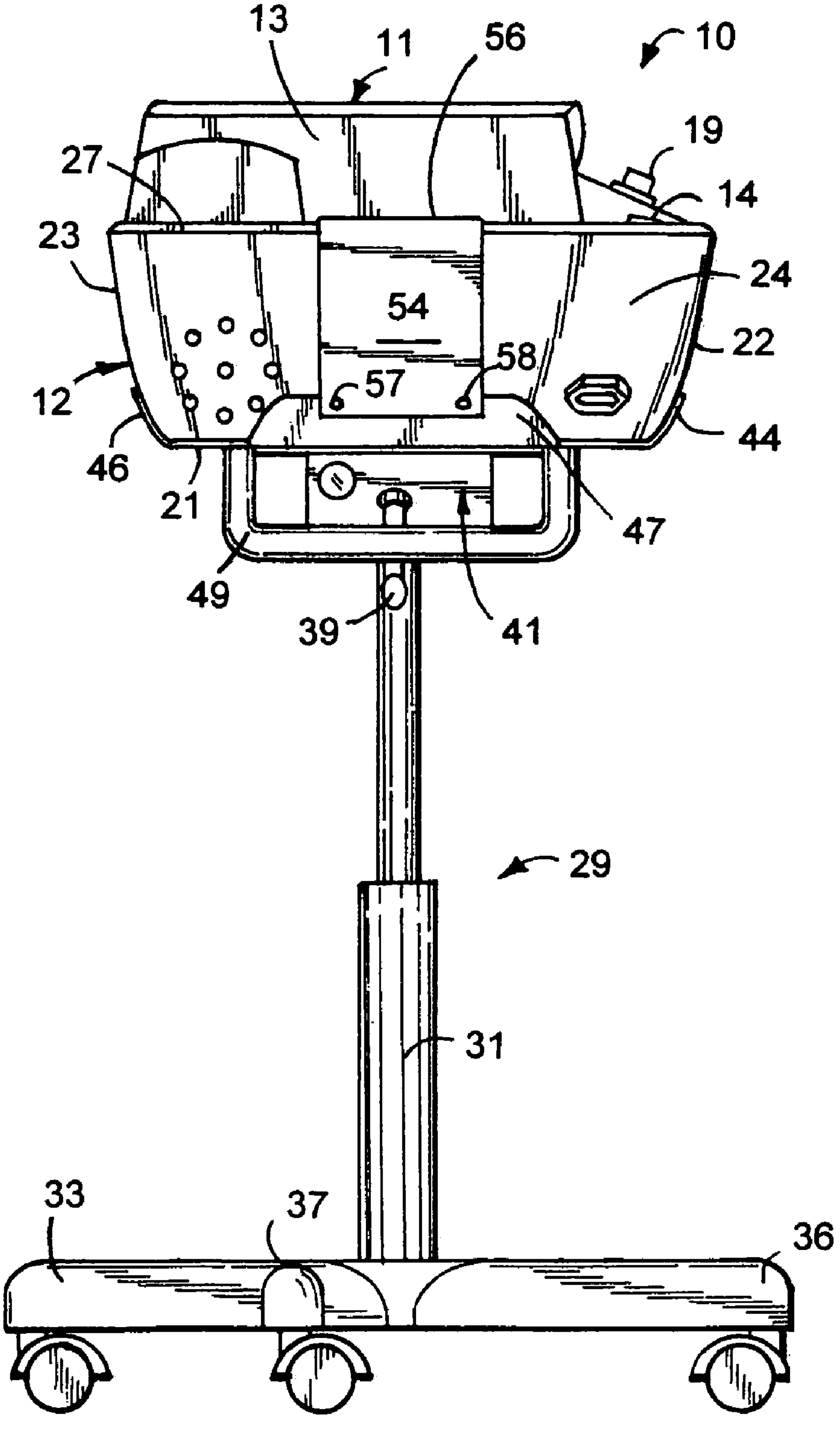
FIG. 5 is a side elevational view of the left side of the air-pulse generator and movable pedestal of FIG. 4.
Figure 6:
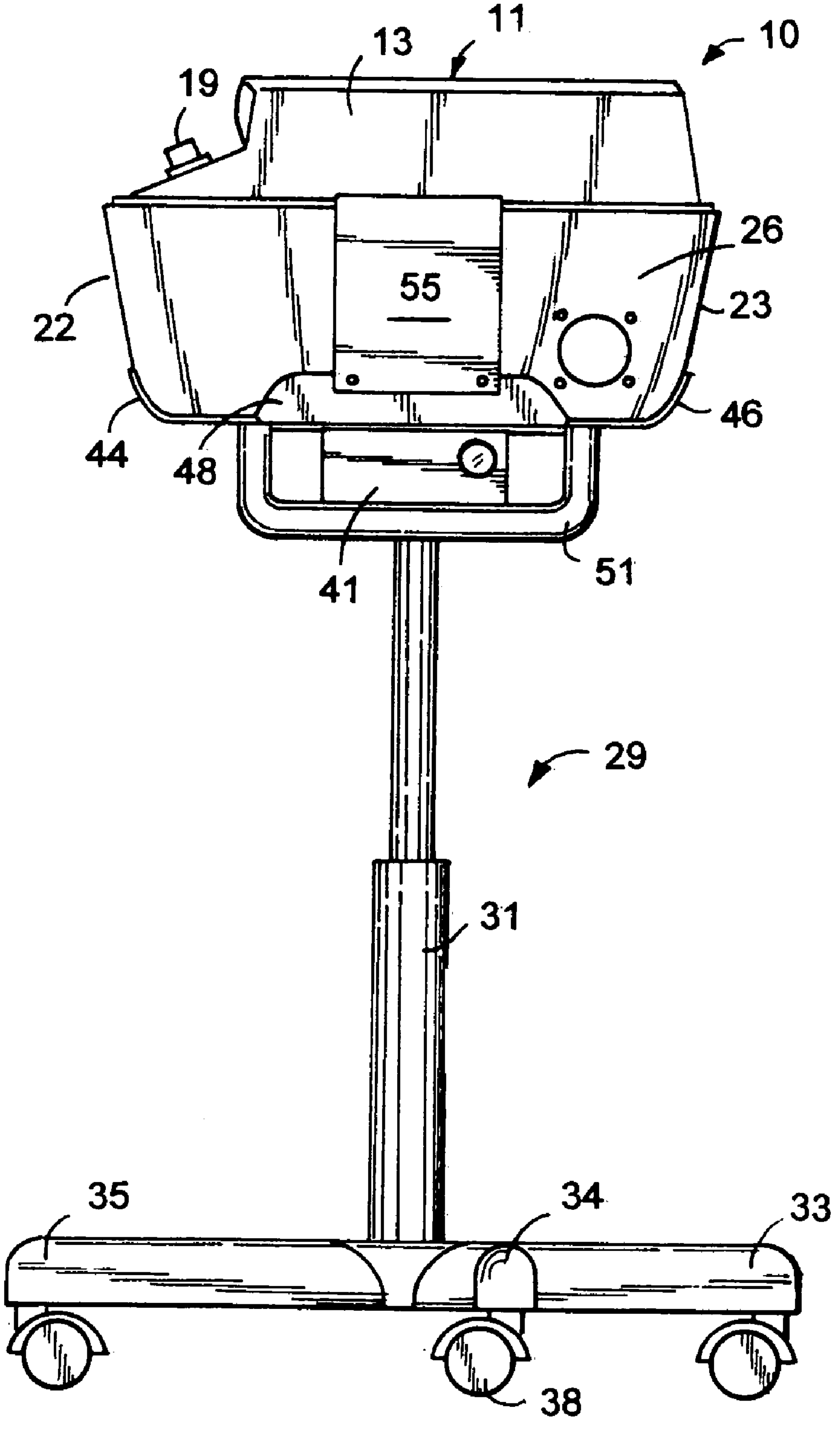
FIG. 6 is a side elevational view of the right side of the air-pulse generator and movable pedestal of FIG. 4.
Figure 8:
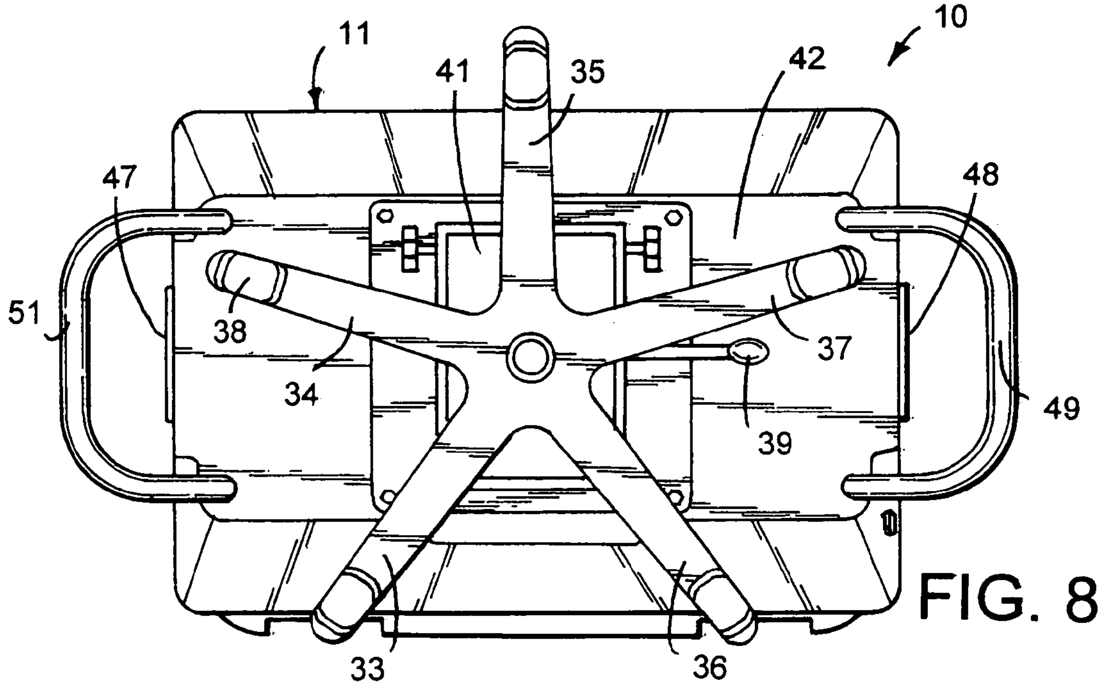
FIG. 8 is a bottom plan view of the air-pulse generator and movable pedestal of FIG. 4.

Pedestal 29, shown in FIGS. 2 and 8, has an upright gas operated piston and cylinder assembly 31 mounted on a base 32 having outwardly extended legs 33, 34, 35, 36 and 37. Other types of linear expandable and contractible devices can be used to change the location of generator 11. Caster wheels 38 are pivotally mounted on the outer ends of legs 33-37 to facilitate movement of body pulsating apparatus 10 along a support surface. One or more wheels 38 are provided with releasable brakes to hold apparatus 10 is a fixed location. An example of a pedestal is disclosed in U.S. Pat. No. 5,366,275. The piston and cylinder assembly 31 is linearly extendable, as shown in FIGS. 4, 5 and 6 to elevate air pulse generator 11 to a height convenient to the respiratory therapist or user. A gas control valve having a hand operated lever 39 is used to regulate the linear extension of piston and cylinder assembly 31 and resultant elevation of generator 11. FIG. 1 shows generator 11 in its down position. FIG. 4 shows generator 11 in its raised or up position. Generator 11 can be located in positions between its up and down positions. Lever 39 and gas control valve are operative associated with the upper end of piston and cylinder assembly 31. An alternative gas control valve and foot operated actuator can be operatively associated with the lower end of piston and cylinder assembly 31.

Returning to FIG. 2, a box-shaped housing 31 attached to the upper end of piston and cylinder assembly 31 supports a flat horizontal rectangular platform 42. Housing 41 includes a top plate below platform 42. Fasteners 43 connected the plate to platform 42. Platform 42 has upright side flanges 44 and 46 and upright end flanges 47 and 48. Outwardly extended V-shaped handles 49 and 51 secured with fasteners 52 and 53 to opposite ends of platform 42 provide hand grips to aid in manual turning and transport of body pulsating apparatus 10.

Figure 3:
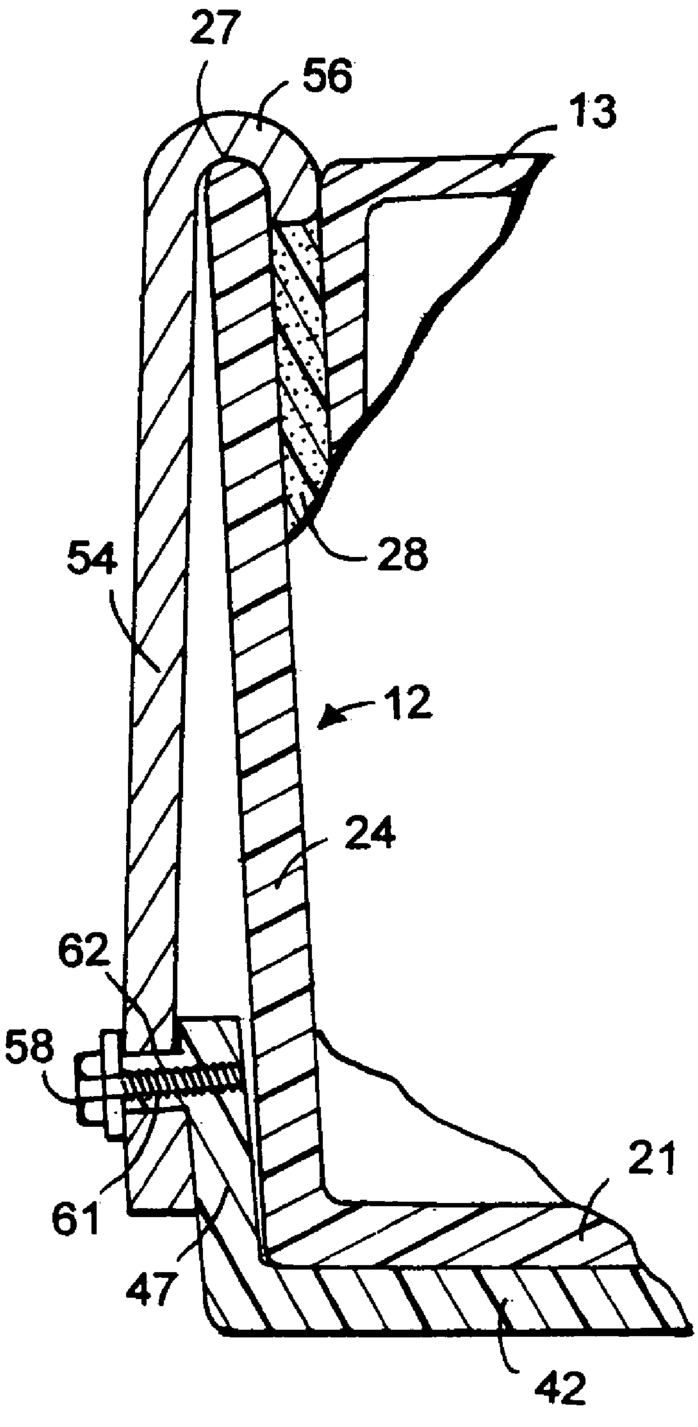
FIG. 3 is an enlarged sectional view taken along line 3-3 of FIG. 1.
Figure 7:
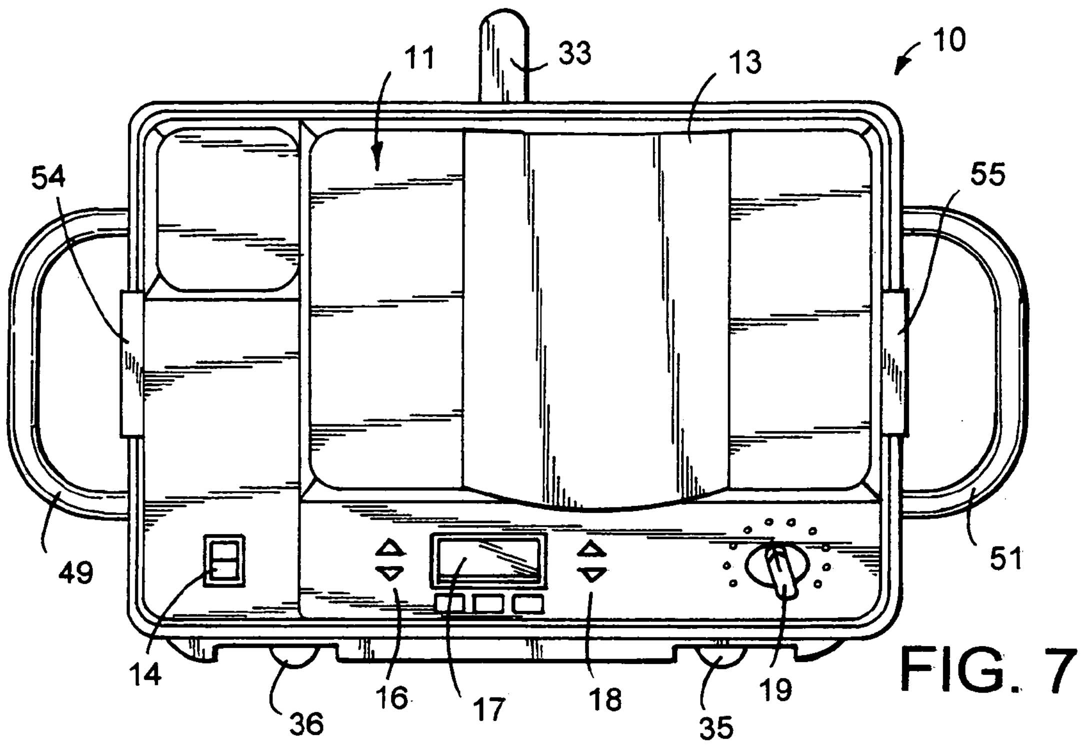
FIG. 7 is a top plan view of the air-pulse generator and movable pedestal of FIG. 4.

As shown in FIGS. 1, 3, 4 and 5, an upright plate or number 54 having an inverted inwardly curved or hook upper end 56 trained over case edge 27 secures and clamps case 12 to flange 47. A pair of fasteners 57 and 58 retain member 54 on flange 47. As shown in FIG. 3, flange 47 has an outwardly projected boss 61 located in a hole 62 in member 54. Fastener 58, shown as a bolt, is threaded into boss 61 to hold member on boss 61. Flange 47 has a second base located in a hole in member 54. Fastener 58 is threaded into the base as illustrated with boss 61 in FIG. 3. A second member 55 identical to member 54, shown in FIGS. 6 and 7, is hooked on case end 26 and connected to end flange 48 with fasteners as illustrated by member 54 in FIG. 3. When case walls 24 and 26 are secured to flanges 47 and 48, the bottom wall 21 of case 12 rests on platform 42 and side flanges 44 and 46 engage opposite side walls 22 and 23 of case 12. This locates case 12 in a non-movable position on platform 42.

The advantages and details of structures and functions of the preferred embodiments have been disclosed. They are exemplary and other equivalents are feasible. Therefore, changes in shape, size, elements, and arrangement of pedestal and generator structures can be made by a person skilled in the area within the scope of the invention.

The invention claimed is:

1. A portable human body pulsating apparatus useable with a vest having an air chamber located around the thorax of a human to apply repetitive compression forces to the thorax of the human comprising:

a generator for creating repetitive air pressure pulses transferable to the air chamber of the vest to apply repetitive compression forces to the thorax of the human, a case accommodating the generator, said case having a bottom wall and upright opposite end walls and upright opposite side walls, a pedestal for supporting the case and generator above a support surface, said pedestal having a generally horizontal platform having opposite ends, said bottom wall of the case being located on the platform, an upright extendable and contractible piston and cylinder assembly having an upper portion secured to the platform operable to adjust the elevation of the platform, case and generator relative to the support surface and a lower portion, a base secured to the lower portion of the piston and cylinder assembly, said base having outwardly extended legs, wheels mounted on the legs engageable with the support surface to facilitate movement of the body pulsating apparatus along the support surface, upright end flanges secured to the platform located adjacent the upright opposite end walls of the case, and fasteners securing the upright end flanges to the end walls of the case to retain the bottom wall of the case on the horizontal platform.

2. The apparatus of claim 1 including:

at least one handle secured to the platform to facilitate manual movement of the human body pulsating apparatus on the support surface.

3. The apparatus of claim 1 including:

outwardly extended handles secured to the opposite ends of the platform to facilitate manual movement of the human body pulsating apparatus on the support surface.

4. The apparatus of claim 1 wherein:

said platform having upright side flanges engageable with the side walls of the case to retain the case on the platform.

5. The apparatus of claim 1 wherein:

the fasteners securing the upright members to the side walls of the case include members having hook portions engageable with said side walls of the case to hold the case on the platform.

* * * * *